Patented Nov. 13, 1951

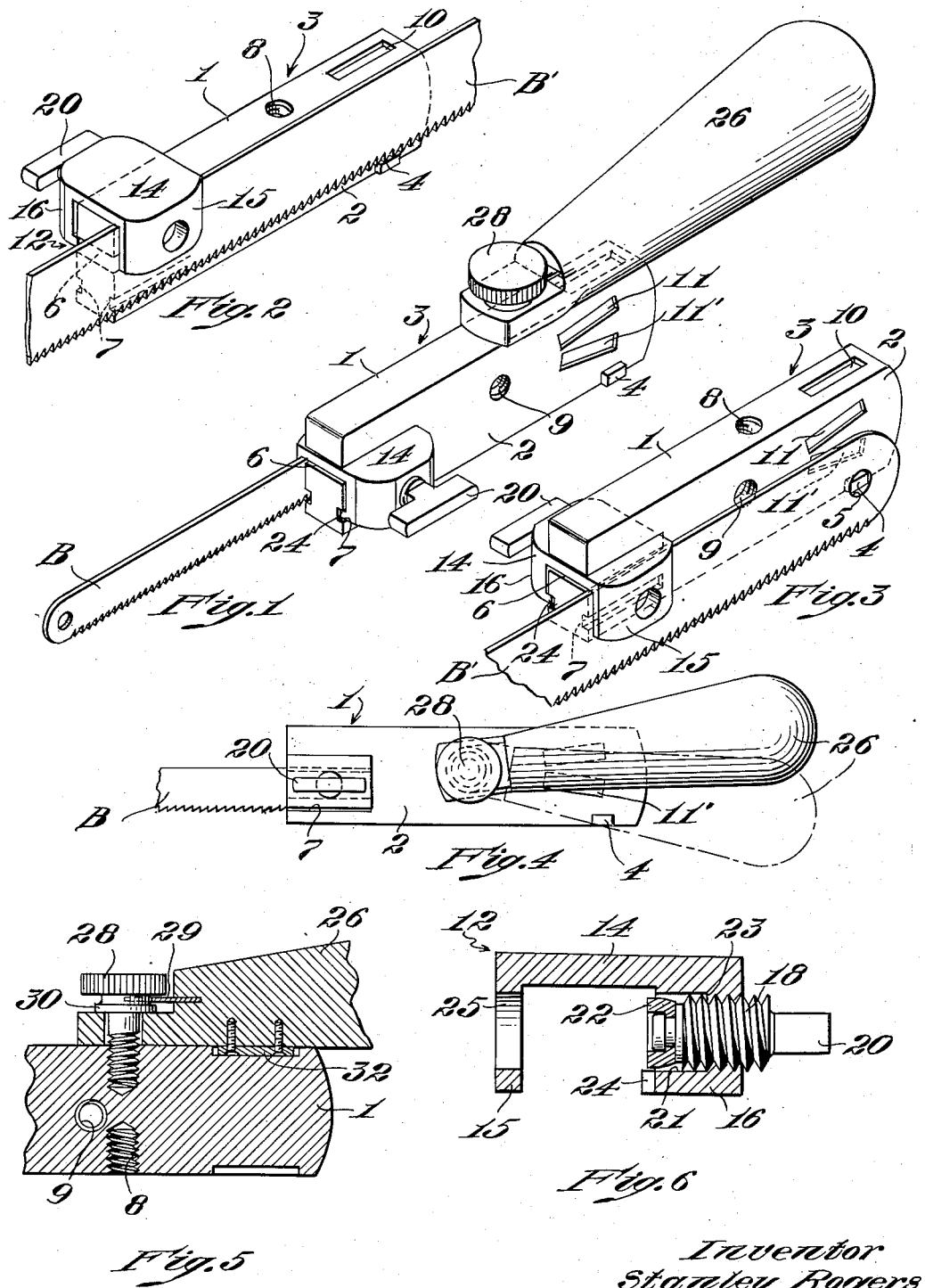

2,575,296

UNITED STATES PATENT OFFICE 2,575,296

SAW BLADE HOLDER

Stanley Rogers, Boston, Mass.

Application September 9, 1948, Serial No. 48,460

2 Claims. (Cl. 145—108)

This invention relates to a holder for saw blades and the like cutting implements, and its principal object is to provide a simple and reliable device capable of holding a saw blade or the like in any one of a plurality of positions so as to permit a more efficient and convenient use of the device than would otherwise be possible, and also to permit its use in confined quarters which otherwise might be inaccessible with saws of the conventional construction.

Further objects relate to various features of construction and will be apparent from a consideration of the following description and the accompanying drawings, wherein:

Fig. 1 is an isometric view of a saw holder constructed in accordance with the present invention and showing a small hack saw blade clamped in one of four possible positions and the handle secured in one of six possible positions;

Figs. 2 and 3 are isometric views illustrating different positions in which a large hack saw blade may be clamped;

Fig. 4 is a side elevation illustrating different positions in which the handle may be clamped;

Fig. 5 is an enlarged vertical section through the body of the holder at its junction with the handle; and Fig. 6 is an enlarged transverse section through the clamping member.

The embodiment herein shown for the purpose of illustration comprises an elongate body member 1 of rectangular cross section having its opposite faces 2 and 3 each formed with an outstanding flange or lug 4 which defines a flat, square abutment or shoulder against which one edge of a hack saw blade B or B' may be squarely seated, as shown in Figs. 1 and 2, or which may project through the usual opening 5 provided at the end portion of a large hack saw blade B', as illustrated in Fig. 3. One end of the body member is formed with a slot 6 (Figs. 1 to 3) which extends from one side face to the other and between the slot 6 and the lower or bottom wall, the side faces 2 and 3 are formed with elongate recesses or grooves 7. The top, bottom and sides of the body member are bored and tapped to provide threaded holes 8 and 9, and slotted to provide elongate recesses 10, 11 and 11' radially disposed relative to the threaded holes 8 and 9.

A U-shaped clamping member 12 (Fig. 6) is formed with a central body portion 14 designed both to fit snugly within the slot 6, in a manner illustrated in Figs. 1 and 3, and also to fit about or straddle the upper edge of top wall of the body member, as shown in Fig. 2, with its legs 15 and 16 overlying the opposite faces or sides of the body member. One of the legs 16 is provided with a transversely extending bore 21 which is threaded, as shown in Fig. 6, to receive a clamping screw 18, the outer end of which carries a handle or operating member 20. In order to prevent accidental removal of the screw, its inner end portion carries an annular member 22 engageable with the annular shoulder 23 defined by the junction of the inner end of the threaded area and the enlarged bore 21. The leg or jaw 15 of the clamping member is provided with an opening 25 which permits the member 22 to be applied or assembled as above explained. The inner edge of the leg 16 is formed with a flange or rib 24 adapted to project into one of the grooves 7 when the part 14 is disposed in the slot 6, as shown in Figs. 1 and 3.

A handle 26 may be detachably secured to the top, bottom or side walls and to this end the handle is provided at one end with a thumb screw 28 adapted to engage one of the threaded openings 8 or 9. The thumb screw 28 is held against accidental removal or displacement by means of a small leaf spring 29, one end of which is pressed into the body of the handle and the other end of which is bifurcated so as to embrace the flanged part 30 of the thumb screw, as shown in Fig. 5, the construction and arrangement of parts being such that the tumb screw 28 and leaf spring 29 coact to prevent each other from being displaced. The under side of the handle is formed or provided with a lug 32, radially disposed relative to the screw 28 and adapted snugly to fit one of the slots or recesses 10, 11 or 11'. The position of the lug 32 relative to the screw 28 corresponds to the position of each of the slots 10, 11 and 11' relative to the associated openings 8 or 9. Hence, the handle 26 may be rigidly secured to the body member 1 in any one of six positions, three of which are illustrated in Figs. 1 and 4.

In using the holder with a narrow hack saw blade of conventional size, the body of the clamp 12 is positioned in the slot 6, as illustrated in Fig. 1, with its leg 15 juxtaposed to the side face 3 against which the blade B is positioned, and its leg 16 juxtaposed to the side 2 so that the rib 24 projects into the groove 7. The clamp 12 thus cooperates with one of the shoulders 4 so that the blade B may be firmly held in any one of four positions, viz., (a) with its teeth against the shoulder 4 on the face 2, (b) with its teeth against the shoulder 4 on face 3, (c) with its back edge against the shoulder 4 on the face 2, or (d) with its back edge against the shoulder 4 on the face 3. The grip 26 may also be held in any one of the six positions above noted, and thus the parts may be assembled into any one of numerous positions, each having its advantages, depending upon the circumstances or locations in which the saw is to be used.

When using a large size hack saw blade B' (Fig. 2), the clamp 12 may be positioned so as to straddle the upper edge of the body portion with its depending leg 15 juxtaposed to one of the side faces so as to engage the body portion of the blade B' thereby cooperating with the adjacent shoulder portion 4 to hold the blade in any one of the four positions above noted. When thus positioned the rib 24 on the leg 16 extends into the slot 6 sufficiently to prevent the clamp from accidentally becoming displaced when the screw 18 is loosened. The grip may likewise be disposed in any one of the positions above described so that with a large size blade the parts may be assembled in any one of several positions with the attendant advantages. It will be noted that the construction and arrangement above described not only permits the use of blades of different sizes and lengths, but also permits lengthwise adjustment of the blade so as to vary the effective length of its cutting edge.

In addition to the positions above described, a large hack saw blade B' may be applied so that the lug or shoulder 4 projects through the opening 5 in the end of the blade and the clamp 12 positioned in the slot 6, as illustrated in Fig. 3. When thus positioned the cutting edge of the blade B' extends below the bottom wall of the holder so that a saw cut may be made on a large flat surface such as a wall or floor.

While I have shown and described one desirable embodiment of the invention, it is to be understood that this disclosure is for the purpose of illustration and that various changes and modifications may be made without departing from the spirit and scope of the invention as set forth in the appended claims.

This application is a continuation-in-part of my copending application Serial No. 624,737, filed October 26, 1945, now Patent No. 2,490,094.

I claim:

1. A holder for a hack saw blade or the like cutting implement comprising an elongate body portion having a plurality of flat faces, an outstanding lug formed on one face of said body member adjacent to one end, said lug not only being adapted to project through the opening in the end portion of a hack saw, but also providing an abutment against which one edge of a hack saw blade or the like may be squarely positioned while the blade rests against said one face of said body member, the opposite end of said body portion having a slot extending from said one face to the opposite face, a U-shaped clamping member having its closed end adapted either to seat on one edge of said body member or fit into said slot and in either position with one leg overlying a portion of said one face and blade when the blade is positioned against said flange and its other leg overlying said opposite face, the legs being operative to engage and clamp the body portion of said blade against said one face, and a grip member secured to said body member.

2. A holder for a hack saw blade or the like cutting implement comprising an elongate body member of substantially rectangular cross section formed at one end with a slot extending from one face to the opposite face and at its opposite end with an outstanding lug formed on one of the faces adapted to project through an opening in the end portion of a hack saw blade while the blade rests against said one face, a substantially U-shaped clamping member having its central portion disposed in said slot with one of its legs overlying a portion of said one face and blade and its other leg overlying said opposite face, said legs being operative to engage and clamp the body portion of said blade against said one face, one face of said body member being formed with a threaded opening and a plurality of spaced slots extending radially from said opening, and a grip member having a screw engaging said threaded opening and a lug extending radially of said screw and adapted to be selectively positioned in one of said slots, whereby said grip member may be adjustably secured to said body member.

STANLEY ROGERS.

REFERENCES CITED

The following references are of record in the file of this patent:

UNITED STATES PATENTS

| Number | Name | Date |
| --- | --- | --- |
| 2,490,094 | Rogers | Dec. 6, 1949 |